United States Patent
Kim et al.

(10) Patent No.: US 11,791,851 B2
(45) Date of Patent: Oct. 17, 2023

(54) COMPACT ULF DIGITAL COMMUNICATION DEVICE FOR UNDERGROUND AND UNDERSEA APPLICATIONS

(71) Applicant: ENIG ASSOCIATES, INC., Bethesda, MD (US)

(72) Inventors: Yil-Bong Kim, Silver Spring, MD (US); Eric N. Enig, Bethesda, MD (US)

(73) Assignee: ENIG ASSOCIATES, INC., Rockville, MD (US)

( * ) Notice: Subject to any disclaimer, the term of this patent is extended or adjusted under 35 U.S.C. 154(b) by 598 days.

(21) Appl. No.: 16/492,399

(22) PCT Filed: Mar. 8, 2018

(86) PCT No.: PCT/US2018/021496
§ 371 (c)(1),
(2) Date: Aug. 6, 2021

(87) PCT Pub. No.: WO2018/165398
PCT Pub. Date: Sep. 13, 2018

(65) Prior Publication Data
US 2021/0288678 A1    Sep. 16, 2021

Related U.S. Application Data

(60) Provisional application No. 62/545,698, filed on Aug. 15, 2017, provisional application No. 62/468,639, filed on Mar. 8, 2017.

(51) Int. Cl.
*H01H 3/26*    (2006.01)
*H04B 1/04*    (2006.01)
*H01Q 9/16*    (2006.01)
*H04B 13/02*   (2006.01)

(52) U.S. Cl.
CPC .............. *H04B 1/04* (2013.01); *H01H 3/26* (2013.01); *H01Q 9/16* (2013.01); *H04B 13/02* (2013.01)

(58) Field of Classification Search
CPC .......... H01H 3/26; H01H 19/00; H01H 39/00; H01Q 9/16; H01Q 9/30; H01Q 13/02; H04B 1/00; H04B 1/04
USPC ................ 307/104, 149; 375/219, 295
See application file for complete search history.

(56) References Cited

U.S. PATENT DOCUMENTS

| 3,541,415 A | 11/1970 | Burch et al. |
| 3,557,325 A | 1/1971 | Hansen |
| 4,114,073 A * | 9/1978 | Uzuka ............ H02P 6/20 318/400.11 |

(Continued)

*Primary Examiner* — Shawkat M Ali
(74) *Attorney, Agent, or Firm* — BROWDY AND NEIMARK, P.L.L.C.

(57) ABSTRACT

An ultra-low or very low frequency communication device composed of: a circuit unit operative to produce an alternating current; and a dipole antenna connected to receive the alternating current and to convert the alternating current into electromagnetic radiation. The antenna is composed of an unshielded radiating conductor and a shielded return conductor connected in series with the radiating conductor, and the return conductor is shielded by a Faraday shield such as a collisionless plasma column that surrounds the return conductor to prevent any electromagnetic radiation from the return conductor.

3 Claims, 8 Drawing Sheets

(56) References Cited

U.S. PATENT DOCUMENTS 6,310,405 B1   10/2001   Han et al.

\* cited by examiner

COMPACT ULF DIGITAL COMMUNICATION DEVICE FOR UNDERGROUND AND UNDERSEA APPLICATIONS

BACKGROUND OF THE INVENTION

The present invention relates to a compact ultra-low frequency Digital Communication Device for underground and undersea applications.

BRIEF SUMMARY OF THE INVENTION

A device according to the invention has the following features:
- It uses the same principle as power line reactive near-field emission at 60 Hz EM.
- It includes a mechanical rotary disc switch or electronic components to generate an AC signal, preferably at a frequency of 1 to 10 kHz AC, with a peak current of 2 to 200 A, radiated from an antenna, which may be composed of wires having a length of the order of 50 cm.
- The device can generate a magnetic flux density of 100 fT (femtoTeslas) at a distance of 1 to 10 km.
- The rotary switch is rotated by a motor that operates at a variable speed controlled by a pulse width modulation (PWM) technique and the speed of the motor determines the frequency of EM wave emitted by an antenna.
- Data transmission is achieved by frequency modulation (FM) in which the frequency is controlled by a motor PWM technique or an electronic FM technique.
- The disc switch inertia can match the motor armature inertia for maximum data transmission rate, or bits per second (bps).

This system, which includes an antenna that can have a length of 50 cm, can generate a square or sine wave having a peak amplitude of 2 to 200 A, and a center frequency of 1 kHz. A current amplitude of 2 A can generate a magnetic field B=100 fT at a distance of 1 km and a current amplitude of 200 A can generate B=100 fT at a distance of 10 km.

The equation to calculate the magnetic near field from an electric dipole antenna is:

$$B = \frac{\mu_o}{4\pi r^2} Il \text{(Tesla)};$$

where $\mu_o$ is magnetic permeability, I is current; l is antenna wire length; and r is the distance from the antenna.

DETAILED DESCRIPTION OF THE INVENTION 1 kHz Operation

Figure 1:
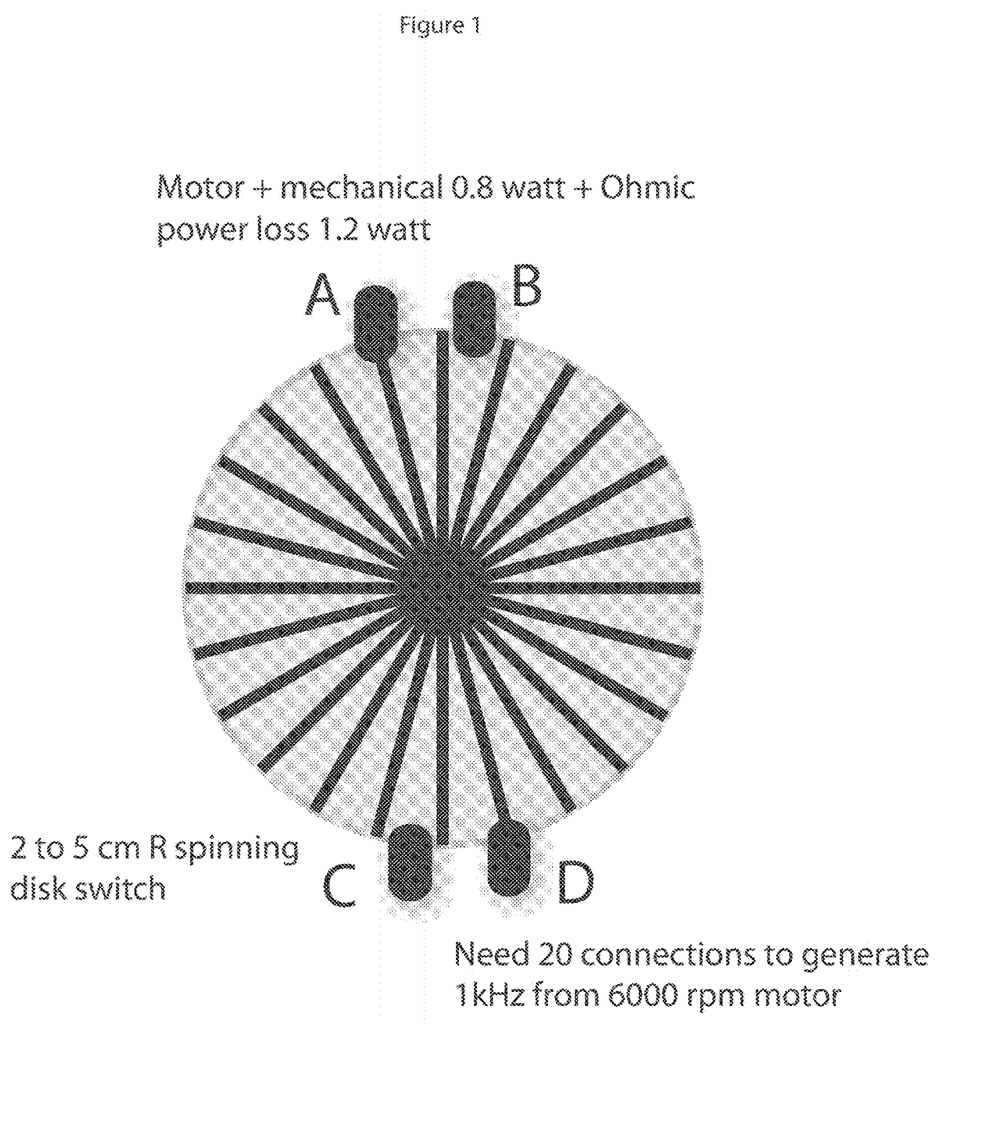
FIG. 1 is a pictorial view of an embodiment of a rotary switch of a device according to the invention.

As shown in FIG. 1, a spinning disk switch is composed of an array of angularly offset, radially extending conductors all conductively connected together at the center of the disk. The outer ends of the conductors lie on a common circle to be contacted by four, e.g., carbon, brushes A, B, C, D. The brushes are stationary relative to the disk. In the first disk position shown, brushes A and D are conductively connected to one another by two conductors while brushes B and C are open circuited. As the disk rotates to a second position, brushes A and D move out of contact with the respective conductors so as to be open circuited and brushes B and C come into contact with corresponding conductors to be conductively connected to one another. During this rotation, connection of brushes B and C to corresponding conductors may occur substantially with disconnection of brushes A and D from their corresponding conductors, or there can be a momentary period between the first and second disk positions when none of the brushes is contacting a conductor.

Figure 2:
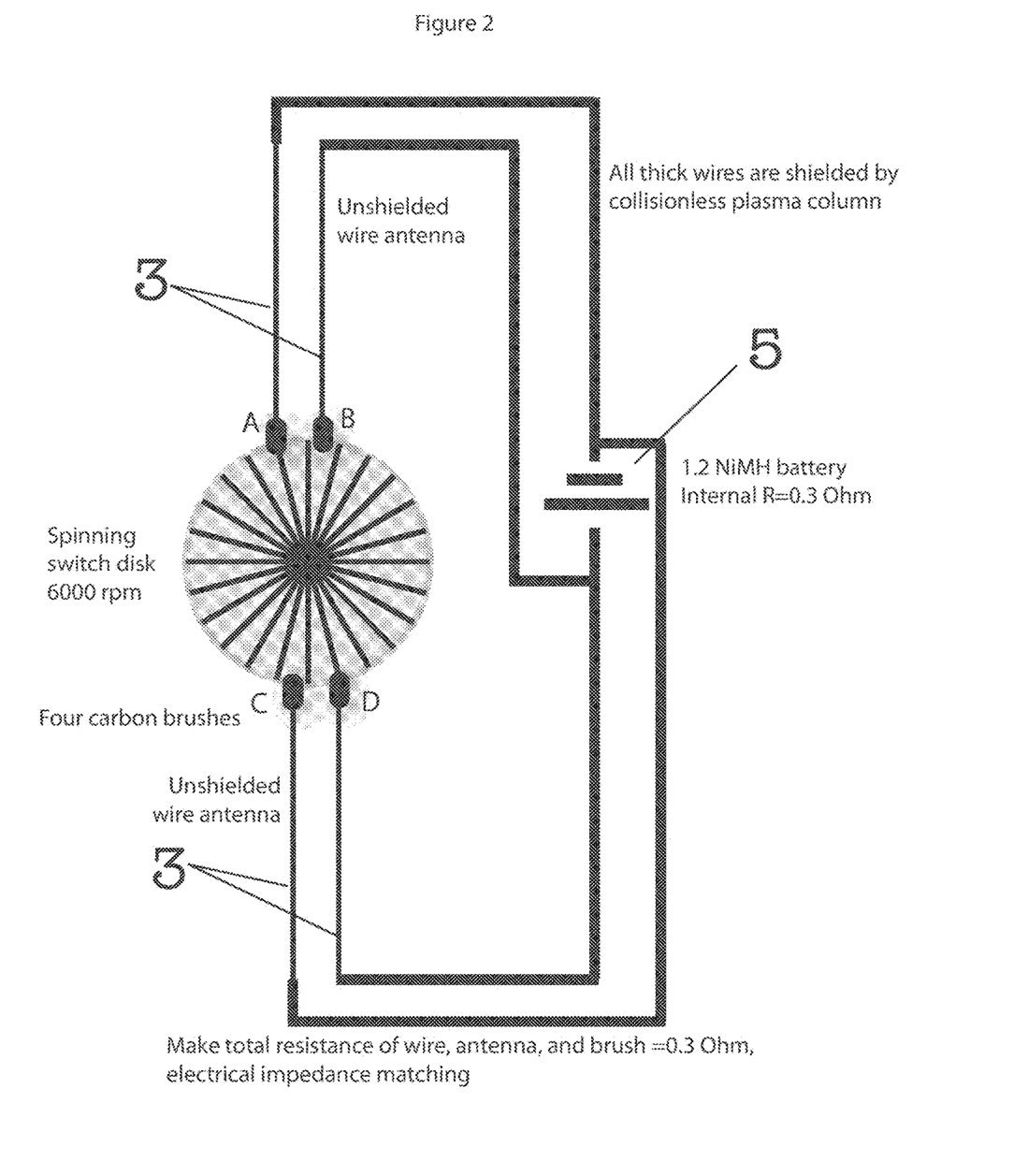
FIG. 2 is a pictorial view of a first embodiment of the device according to the invention, including the switch of FIG. 1, a linear antenna connected to the switch and a power supply battery.

FIG. 2 shows a first embodiment of a device according to the invention, in which each of the brushes A-D is connected to a respective unshielded antenna wire 3 (shown in relatively thin lines). The antenna wires are connected, at their free ends, to a DC power supply, such as a battery. Connected between the free ends of the unshielded antenna wires and a battery 5 are connecting wires (shown in relatively thick lines). The connecting wires and the battery are all shielded by a Faaday shield, which is preferably a collisionless plasma annular column or columns that effectively prohibits any EM radiation from these connecting wires.

The term "plasma", as used herein, is defined as a hot ionized gas consisting of approximately equal numbers of positively charged ions and negatively charged electrons. The characteristics of plasmas are significantly different from those of ordinary neutral gases so that plasmas are considered a distinct "fourth state of matter." For example, because plasmas are made up of electrically charged particles, they are strongly influenced by electric and magnetic fields.

A collisionless plasma is a plasma in which particles interact through the mutually induced space-charge field, and collisions are assumed to be negligible.

These plasma columns provide evanescent wave attenuation of collisionless plasma that has a very large effective and negative dielectric constant. Without the shield, current through the connecting wires could produce radiation that offsets, or neutralizes, radiation form the conducting antenna wires. The connections between the antenna wires and the power supply are such that in the operating state shown, the switch conductively connects brushes A and D together, while brushes B and C are open-circuited initially. Current flows from brush A to brush D.

After about 0.5 ms, for example, while the disk switch is spinning, brushes B and C are conductively connected together and brushes A and D are open-circuited so that current flows in the opposite direction from brush C to brush B.

Thus, the direction of current flow through the wires of the switch when connected to brushes A and D is opposite to that through the wires when connected to brushes C and B.

In the embodiment shown, there are 20 conductor pairs. So the above two-step process occurs 10 times during one rotation of the disk switch. When the motor is driven at a speed of 6000 rpm (i.e. 100 rotations per second), the antenna will emit a 1 kHz square wave.

Figure 3:
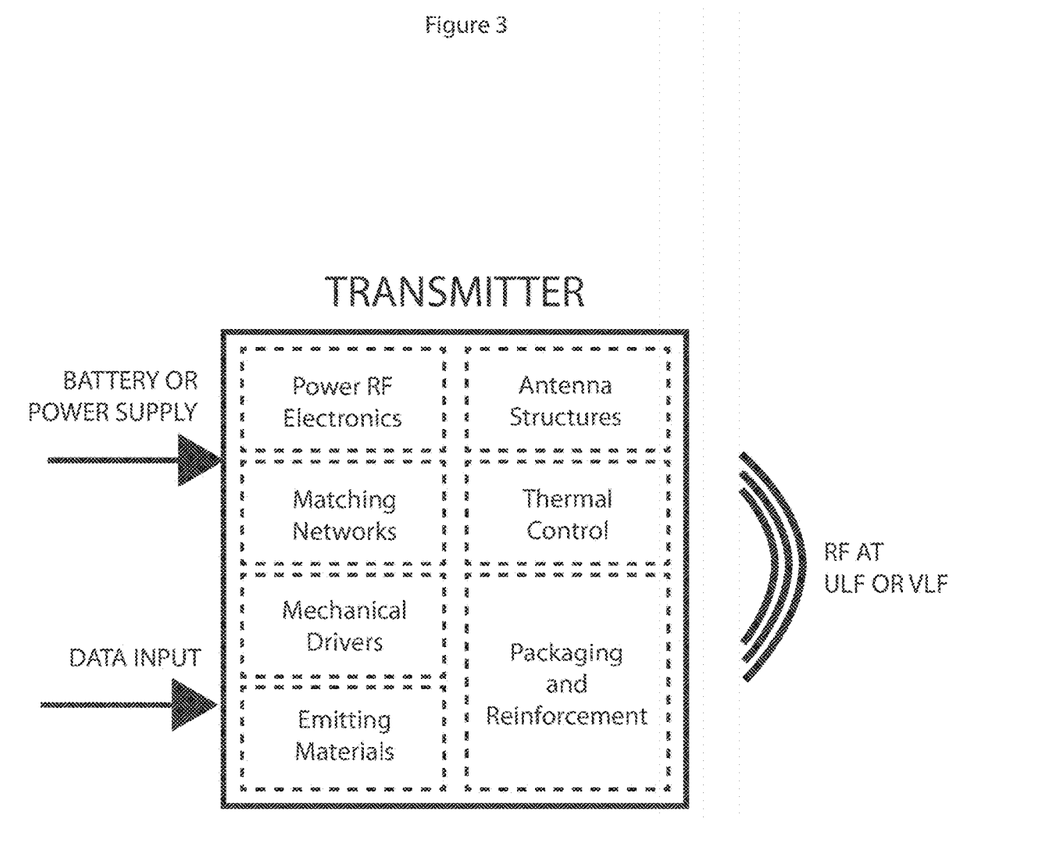
FIG. 3 is a block diagram of the device including the circuit components for controlling the rotation speed of the motor driving the rotary switch for generating a 1 kHz ULF carrier wave.

FIG. 3 shows the components of a transmitter system including pulse width modulation (PWM) components for controlling rotation of the rotary switch for FM modulation of the data and generation of ULF carrier wave and required elements such as thermal control and packaging. The PWM components can be constituted by a commercially available product such as the RioRand RR-PWM-15V supplying a Low DC Voltage 2 Amp Motor Speed Controller PWM, Marketed by RioRand Advanced Technology, This controller may supply a voltage of 1.8V, 3V, 5V, 6V, or 12V, for example.

Figure 4A:
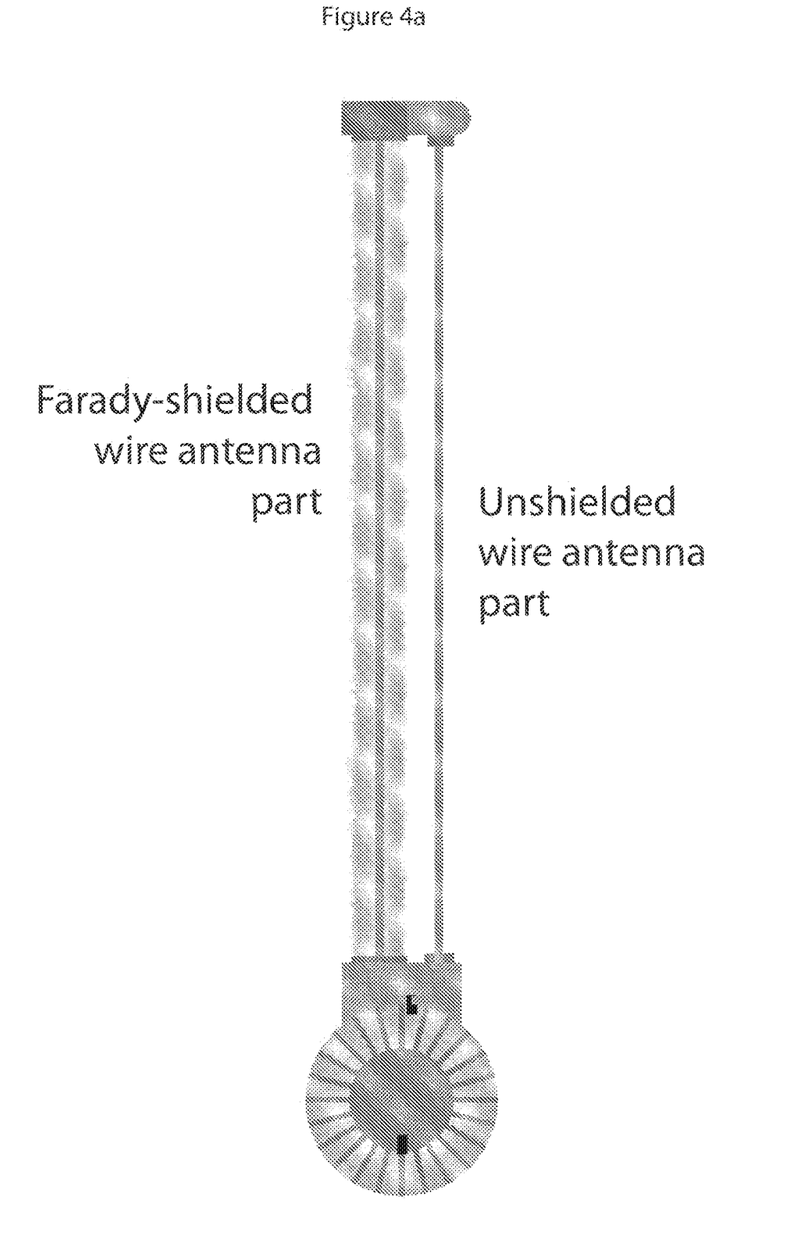
FIG. 4A is a pictorial view of a second embodiment of the invention in which one part of the linear antenna is shielded by a collisionless plasma annular column.

FIG. 4A shows a rotary switch connected to be rotated by the shaft of a drive motor controlled by components of the transmitter system of FIG. 3. The shaft is preferably made of electrically insulating or dielectric material that does not conduct current. The device shown in FIG. 4A, has a modified antenna composed of a Faraday-shielded or, preferably, a collisionless plasma-shielded wire part and an unshielded radiating wire part, the wire parts being conductively connected together at their outer ends to form a linear electric dipole antenna.

The collisionless plasma-shielded wire part is surrounded by a tube that contains the plasma.

The rotary switch of FIG. 4A is similar in concept to the switch of FIGS. 1 and 2, connected to be rotated by the nonconductive shaft of a drive motor controlled by components of the transmitter system of FIG. 3. The switch of FIG. 4A is composed of a conductive central disk and a plurality of radially extending conductors constructed to cyclically reverse the direction of current flow through the antenna wire parts.

Figure 4B:
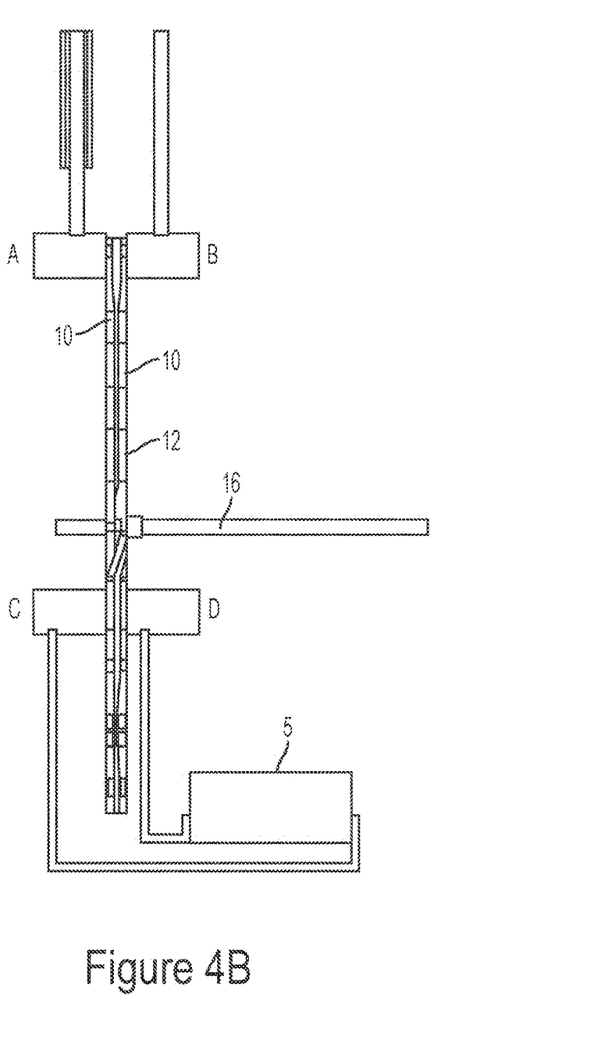
FIG. 4B is a pictorial side view of a rotary switch that can be used with the device of FIG. 4A.

FIG. 4B shows a possible example of the switch of FIG. 4A. This switch is composed of two plates 10 of insulating material each having a conductive central ring and a plurality of radially extending conductors. The central ring on one plate is electrically insulated from that on the other plate. At the outer edges of the switch plates, every other radially extending conductor on one plate is connected by a wire 12 to a radially extending conductor on the other plate. Brush A is connected to the free end of the shielded antenna wire part and Brush B is connected to the free end of the unshielded antenna wire part. Brushes C and D contact respective conductive central rings of the switch and are connected to opposite sides of direct current source 5.

With this structure, in a first angular position of the switch, brush A will be connected to brush C and brush B will be connected to brush D. Then, in the next angular position of the switch, brush A will be connected through a wire 12 to brush D and brush B will be connected through a wire 12 to brush C. Thus, the direction of current flow through the antenna will be reversed.

In the embodiment of FIGS. 4A and 4B, the shielding of one antenna wire part will have the same effect as the shielding described with reference to FIG. 2.

Figure 4C:
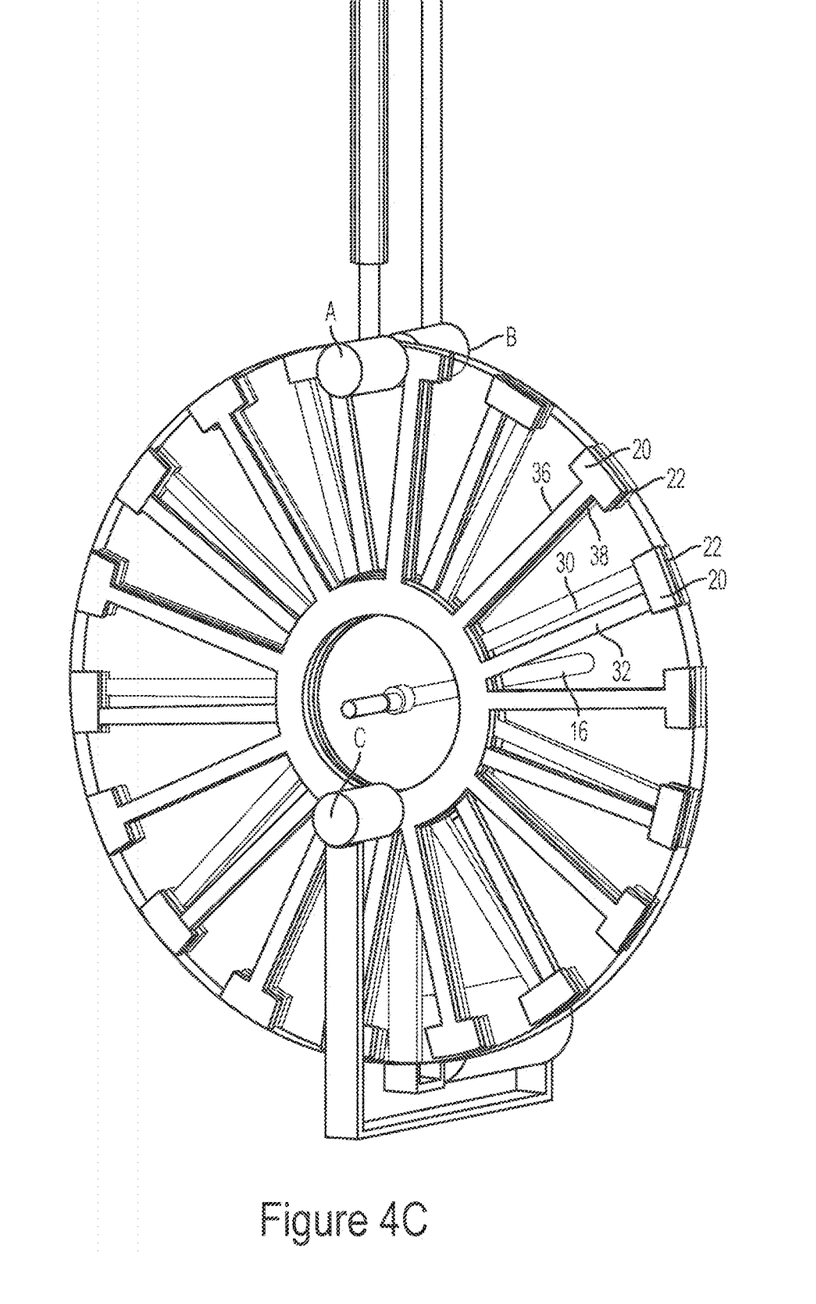
FIG. 4C is a perspective view drawn to show both plates of the rotary switch of FIG. 4B.

FIG. 4C is a perspective view showing both plates (10 in FIG. 4B) of the rotary switch, each provided with a conductive central ring electrically isolated from drive shaft 16. The plate that appears to be in front and is contacted by brushes A and C will be referred to as the frontal plate and the other plate will be referred to as the rear plate. The frontal plate carries an array of brush contacts 20 along its outer edge, while the rear plate carries a similar array of brush contacts 22, each contact being connected to a respective radially extending conductor. The radially extending conductors extend between the brush contacts, 20, 22, and the conductive central rings in a manner to cause rotation of the rotary switch to produce the current direction reversal, and hence the alternating current, in the antenna. Thus, conductor 30 is connected between a brush contact 20 on the frontal plate and the conductive central ring on the rear plate and conductor 32 is connected between a brush contact 22 on the rear plate and the central conductive ring on the frontal plate. At an adjacent angular location of the rotary switch, a conductor 36 is connected between a brush contact 20 on the frontal plate and the conductive central ring on the frontal plate and a conductor 38 is connected between a brush contact 22 on the rear plate and the central conductive ring on the rear plate.

Figure 4D:
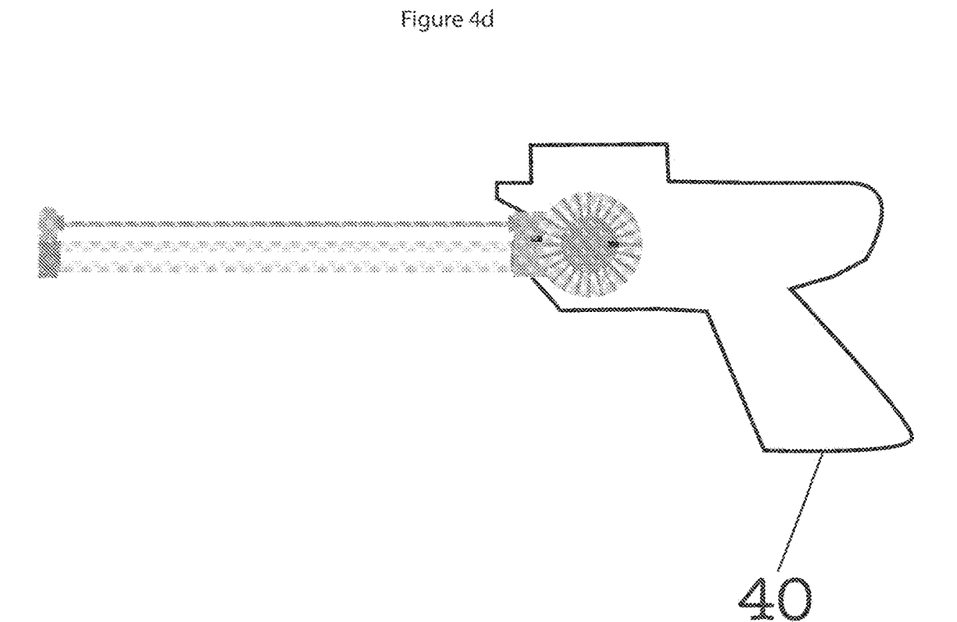
FIGS. 4D and 4E are pictorial views showing the structure of two devices according to the invention.

FIG. 4D is a pictorial side view showing one practical embodiment of the device, here composed of the antenna and rotary switch of FIG. 4A, together with the required power supply and circuitry (not shown in FIG. 4D) housed in an enclosure 40. The size and structure of the antenna allows the device to be conveniently hand-held.

Figure 4E:
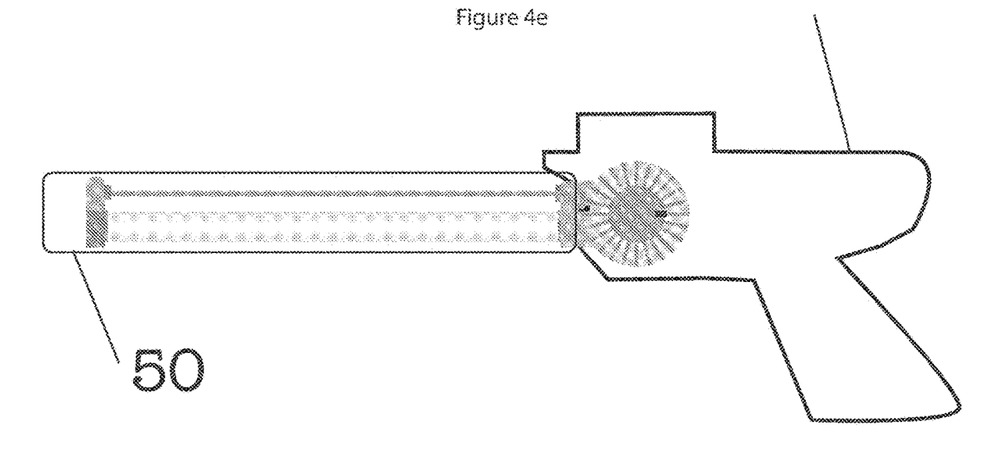

FIG. 4E is a view similar to that of FIG. 4D showing the device of FIG. 4D together with a protective cover 50 that encloses the antenna parts and is transparent to the radiation produced by the antenna.

Figure 4F:
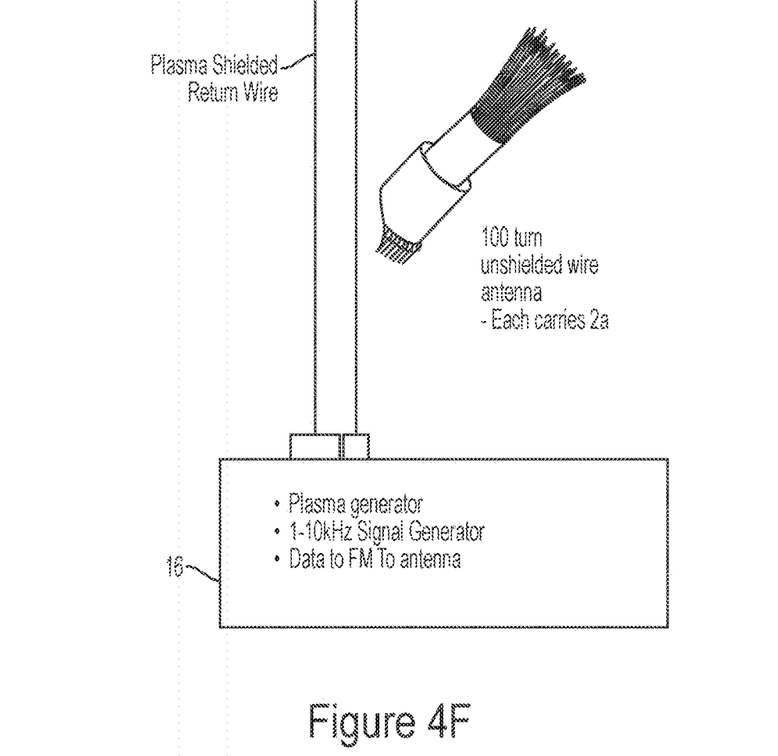
FIG. 4F is a pictorial view of the linear antenna of a third embodiment of the invention composed of a collisionless plasma shielded return conductor and an unshielded radiating conductor composed of, for example, 100 individual wires.

FIG. 4F is a detail view of a further embodiment of the invention having the same antenna. This embodiment is composed of an antenna identical to that of FIG. 4A and an electronic generator 16 connected to the free ends of the antenna wire parts to produce an AC drive current and supply the current to the antenna.

The unshielded conductor may be composed of a plurality of, e.g, 100, unshielded wires from which the EM field will be radiated. Each wire may be connected to carry a current of 2 amperes.

In all of the disclosed embodiments the shielding neutralizes the influence of current through the shielded part to substantially increase the intensity of radiation emitted from the unshielded antenna wires.

FM Modulation

The motor rpm is controlled by the PWM circuit, and digital input data controls the PWM circuit to modulate motor rotation speed and at the same time the emitted ULF wave frequency is modulated. According to one example, the motor speed can be varied between 3780 and 6000 rpm The motor preferably has a mechanical time constant of the order of 1 ms. The disk switch inertia is preferably matched to the motor armature inertia for mechanical impedance matching. Brush friction is minimized and a 50 bit/second (bps) data rate is feasible.

Thermal Control

Wire Joule heating and brush friction heating will be at acceptable levels for a square wave current level of 2 Amperes using wires having a thickness of at least 22 gauge.

The motor for driving the rotary switch may be operated with an input of 0.8 watt+Ohmic power loss of 1.2 watts. This system can be operated with very low power battery of total power consumption of 2 watts.

In the illustrated embodiments:

In the embodiment of FIGS. 1 and 2, Brushes A and C will be connected to the negative power supply terminal and brushes B and D will be connected to the positive power supply terminal.

With 20 rotary switch conductor pairs, a 1 kHz square wave current can be produced along an upper wire and a lower wire, each wire having a length of, e.g., 25 cm.

In the embodiment of FIGS. 4A and 4B, the return wire is Faraday shielded with an annular collionless plasma column with negative dielectric permittivity. Alternatively, the return wire may be Faraday shielded with a high μ metal (e.g., skin depth of iron at 1 kHz~65 μm). The unshielded wire emits a reactive 1 kHz electric dipole field. Each antenna wire may have a length of 50 cm.

FM modulation is produced by motor RPM control with PWM.

Matching rotary switch inertia with motor armature inertia makes possible maximum bps (1 ms mechanical time constant motors are currently available).

To produce an output sine wave, a low pass filter can be used, or the disc switch can be replaced by a suitable electronic circuit constructed according to principles well known in the relevant art.

This device can be scalable to smaller size and lower current.

The device is also scalable to higher output if more than 2 W is allowed or size, weight and power (SWaP) limitations are relaxed.

The energy required to reach steady state is negligible.

Practical embodiments of the device do not need any new material development.

The modulation energy is less than 5 mJ per bit due to low inertia of the rotary, or disk, switch.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An ultra-low frequency (ULF) or very low frequency (VLF) communication device comprising:
   rotary switch having a plurality of conductors arranged in pairs and first and second pairs of contact elements;
   a direct current supply having a positive terminal connected to at least one contact element of the first pair of contact elements and a negative terminal connected to at least one contact element of the second pair of contact elements;
   a motor connected to said rotary switch for rotating said rotary switch; and
   a control circuit connected to said motor for varying an operating speed of said motor to modulate an emitting ULF or VLF wave frequency to transmit digital data, wherein:
   said rotary switch is configured such that during rotation of said rotary switch, each contact element is connected in turn to successive conductors such that current flows in a first direction though a conductor pair, and then flows in a second direction, opposite to the first direction, through the conductor pair, generating ULF or VLF alternating current wave.

2. The device of claim 1, further comprising a dipole antenna connected to said rotary switch.

3. The device of claim 2, wherein:
   the dipole antenna is a linear dipole antenna having a first part shielded by a shield consisting of a Faraday shield which is a collisionless plasma annular column to attenuate electromagnetic (EM) radiation from the first part of the linear dipole antenna evanescently and a second part that is an unshielded antenna to emit a pure near-field electric field; and
   the contact elements of the rotary switch are connected to said antenna first and second parts for generating ULF or VLF frequency modulated signals to send low frequency EM waves to long range destinations even through radio frequency-denied underground and undersea media, wherein:
   said linear dipole antenna is configured such that during EM wave radiation, said first part of said linear dipole antenna is shielded by the Faraday shield and said second part of said linear dipole antenna effectively radiates pure electric dipole radiation in a low frequency spectrum.

* * * * *